March 19, 1929.  M. W. ATWOOD  1,706,132
THROAT BLOCK
Filed June 15, 1925
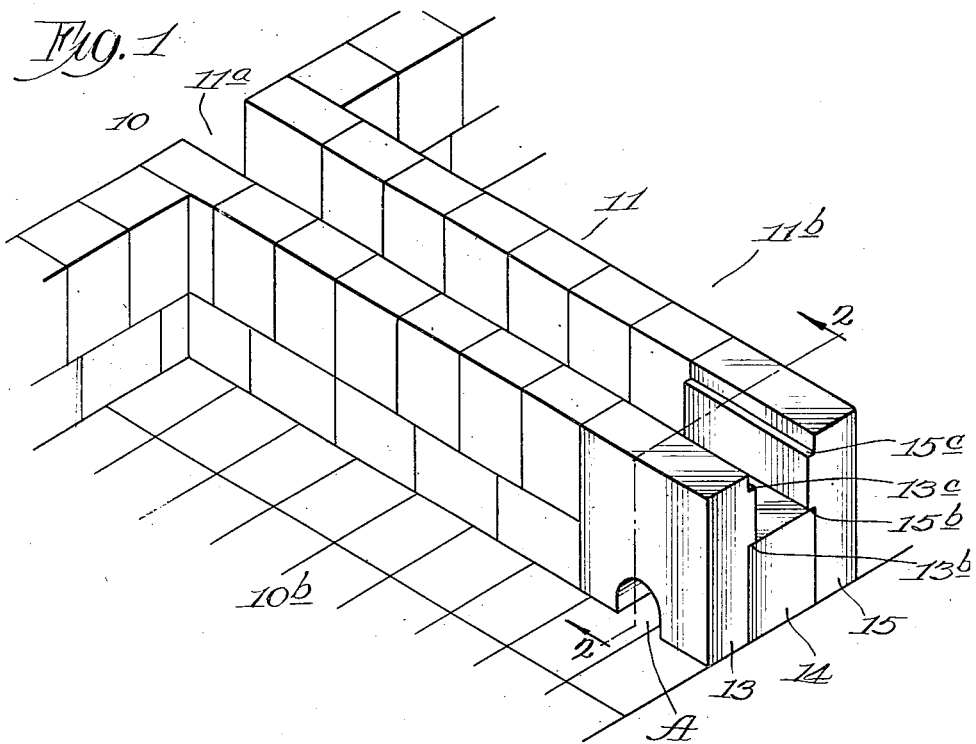
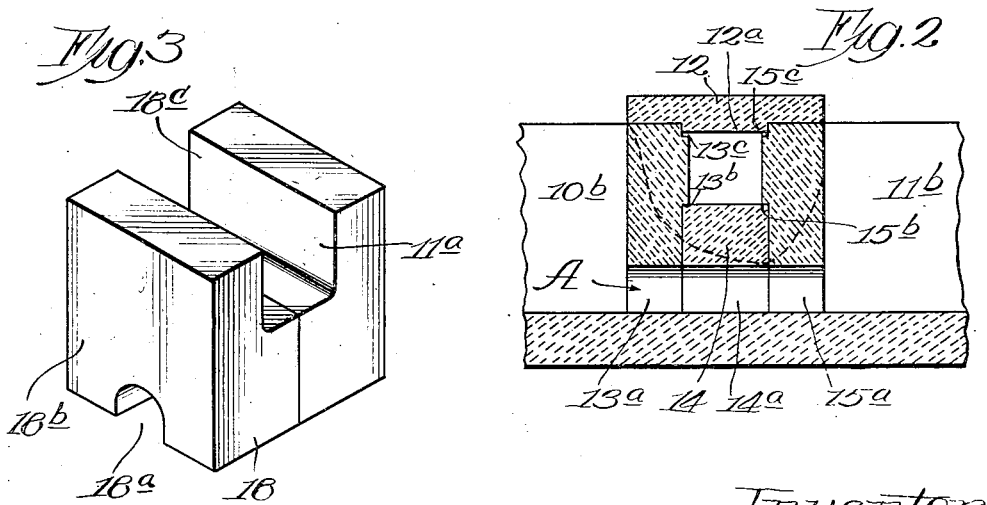
Inventor,
Max W. Atwood
By Wallace R. Lane
Atty Patented Mar. 19, 1929.

1,706,132

UNITED STATES PATENT OFFICE.

MAX W. ATWOOD, OF ST. LOUIS, MISSOURI, ASSIGNOR TO LACLEDE-CHRISTY CLAY PRODUCTS COMPANY, OF ST. LOUIS, MISSOURI, A CORPORATION OF MISSOURI.

THROAT BLOCK.

Application filed June 15, 1925. Serial No. 37,081.

This invention relates to throat blocks and has for its object the provision of a throat block which may be incorporated in a glass or other melting tank to permit flow. In present day construction and heretofore in glass-melting tanks, for example, a dam is provided across the tank separating the melting end from the refining end, with a reduced duct leading through the dam to permit the flow from one end to the other. It is the practice to form this duct by a number of blocks or brick laid in courses, as a result of which horizontal joints are included in the outer faces of the dam adjacent to the duct and opposed to the flow of the molten material. It is customary and desirable to provide in the dam a ventilating or air passage extending from one end to the other, and corrosion or disintegration at the horizontal joints results with premature breaking down which permits leakage of the molten constituents into the air passage.

It is the object of this invention to provide a throat block construction which eliminates horizontal or other joints in the face of the dam surrounding the flow duct, with greatly increased resultant life and the elimination of corrosion resulting in leakage until relatively long use of the block has been had.

In the drawings Fig. 1 is a perspective view of a portion of a glass melting tank, the view being into the bottom thereof.

Fig. 2 is a vertical section along the line 2—2 of Fig. 1, the line of approximate corrosion or deterioration shown in dotted lines.

Fig. 3 is a perspective of a modified arrangement of throat blocks.

Like numerals refer to like elements throughout the drawings in which 10 indicates generally a glass melting tank across the interior of which extends a dam 11, dividing the tank into the two portions 10$^b$ and 11$^b$, in the former of which the melting of the batch or constituents takes place, and in the latter of which the molten glass is refined or otherwise treated.

The dam is provided with the transverse ventilating or air passage 11$^a$ which may be covered with tile 12 or the like if so desired. See Fig. 2. Incorporated in the dam are the throat blocks 13, 14 and 15, all of these blocks being provided with the bottom grooves or ducts 13$^a$, 14$^a$ and 15$^a$ to form the flow duct A between the tank portions 10$^b$ and 11$^b$. The outer blocks 13 and 15 are identical in construction and are provided at their inner opposed faces with the shoulders 13$^b$ and 15$^b$ beneath which is set the block 14, which is thus restrained and held by the outer throat blocks. At the upper inner corners the blocks 13 and 15 may be notched as indicated by numerals 13$^c$ and 15$^c$ to accommodate the depending boss 12$^a$ of the cover blocks 12.

In Fig. 3 I have illustrated a modified form of throat blocks which permits dispensing with intermediate block 14. In this form throat blocks 18 are identical, being provided with the flow ducts 18$^a$ and the outer faces 18$^b$, which as with blocks 13 and 15 previously described extend upwardly above the fluid level of the molten material and the top of the dam 11. The blocks 18 are recessed at their upper inner corners as indicated by numeral 18$^c$, these inset or recessed portions forming the air space or passage 11$^a$ when assembled.

In Fig. 2 I have illustrated with a dotted line the approximate line of deterioration or corrosion when my throat blocks are used, and it will be apparent that with the smooth, unbroken, non-jointed, outer face above and surrounding the entrance to duct A, corrosion will not result in the formation of cracks or the like leading to the ventilating passage 11$^a$ which would permit leakage of the molten material as in present day construction.

My invention is susceptible of modification and I do not wish to be restricted to the form shown and described except as defined in the appended claims.

What I claim is:

1. A tank having a transverse wall, said wall including a block having a duct therethrough, said block having an unbroken outer face opposed to the content of said tank and extending above the level of said content.

2. A tank having a transverse wall, a plurality of blocks in said wall having ducts aligned to form a flow duct through said wall, the outer face of the block opposed to said flow being unbroken and extending above the level of the content of said tank.

3. A tank having a transverse wall, a plurality of blocks in said wall having ducts aligned to form a flow duct through said wall, the outer face of the block opposed to said flow being unbroken and extending above the level of the content of said tank, said blocks being recessed between the outer faces thereof to form a transverse air space.

4. An article of manufacture comprising a throat block for melting tanks or the like formed with a flow duct and an upwardly extended front face, said block being recessed at its rear upper portion.

5. A duct structure for glass melting furnaces, comprising a body block having a transverse opening therethrough, and side blocks having transverse openings therethrough to register with the similar opening in the body block, and there being a longitudinal rabbet in the face of each side block to register with and engage the sides of the body block.

6. In a glass melting furnace of the kind described, in combination with the opposed furnace walls, a body block, side blocks adapted to form a part of the furnace walls and having rabbeted sides to coengage the sides of the body block, there being a tunnel through said blocks.

7. A tank having a transverse wall and a throat, said throat being formed by a plurality of blocks in said wall, including a front block having an unbroken face extending above the level of the liquid in said tank, a center block and a rear block, said face and rear blocks overlying and restraining said center block.

In witness whereof, I hereunto subscribe my name to this specification.

MAX W. ATWOOD.